US 6,748,691 B2

(12) United States Patent
Doucette (10) Patent No.: US 6,748,691 B2
(45) Date of Patent: Jun. 15, 2004

(54) WRIST BRACE FOR ANGLERS (76) Inventor: David A. Doucette, 4 Creek View Dr., Hamlin, NY (US) 14464

( * ) Notice: Subject to any disclaimer, the term of this patent is extended or adjusted under 35 U.S.C. 154(b) by 0 days.

(21) Appl. No.: 10/092,001

(22) Filed: Mar. 6, 2002

(65) Prior Publication Data

US 2003/0167673 A1 Sep. 11, 2003

(51) Int. Cl.⁷ ................................................ A01K 87/00
(52) U.S. Cl. .......................................... 43/25; 43/21.2
(58) Field of Search .................. 43/21.2, 25; D22/139, D22/142, 147; 248/534

(56) References Cited

U.S. PATENT DOCUMENTS

| 2,146,350 | A | * | 2/1939 | Roberts | 43/25 |
| 2,244,408 | A | * | 6/1941 | Thompson | 43/25 |
| 2,443,946 | A | * | 6/1948 | Bozorth | 43/25 |
| 2,482,192 | A | * | 9/1949 | MacDonald | 43/25 |
| 3,159,939 | A | * | 12/1964 | Transeau | 43/25 |
| 3,367,056 | A | * | 2/1968 | Johnson | 43/25 |
| 3,372,510 | A | * | 3/1968 | Arsenault | 43/25 |
| 3,410,016 | A | * | 11/1968 | Arsenault | 43/21.2 |
| 4,014,129 | A | | 3/1977 | Capra | 43/23 |
| 4,190,977 | A | | 3/1980 | Casper | 43/21.3 |
| 5,159,775 | A | | 11/1992 | Sutula, Jr. | 43/21.2 |
| 5,212,900 | A | | 5/1993 | Perry | 43/21.2 |
| 5,313,735 | A | * | 5/1994 | Latouche | 43/25 |
| D353,262 | S | | 12/1994 | Cantavespre et al. | D3/221 |
| 5,910,004 | A | * | 6/1999 | Antosh | 43/21.2 |
| 5,992,079 | A | | 11/1999 | Michels et al. | 43/18.1 |
| 6,098,333 | A | | 8/2000 | Wickizer et al. | 43/23 |
| 6,295,755 | B1 | | 10/2001 | Macaluso | 43/25 |
| D464,106 | S | * | 10/2002 | Macaluso | D22/147 |

FOREIGN PATENT DOCUMENTS

| DK | 77150 | * | 2/1954 | 43/25 |
| FR | 899565 | * | 6/1945 | 43/25 |
| NO | 76424 | * | 3/1950 | 43/25 |
| WO | 91095518 | * | 7/1991 | 43/25 |

OTHER PUBLICATIONS

American Heritage Dictionary, Second College Edition, p. 513, 1982.*
Leverage–King™, product produced by Mic–Mac Products, Inc., Flushing, NY, 11354, information from packaging and advertisement, ,patent pending.

* cited by examiner

Primary Examiner—Kurt Rowan
(74) Attorney, Agent, or Firm—Brown & Michaels, PC (57) ABSTRACT A light weight wrist brace for anglers of all ages that is inherently self-adjusting and shock absorbing by virtue of its use of a flexure formed as an arcuate resilient connecting member. The connecting member is intermediate a forearm rest or cradle and a fastener adapted for connection to the handle of a fishing rod. The invention can be simply and easily molded as a single part from well-known thermoplastic materials using skills and techniques well known in the arts of plastic forming.

2 Claims, 9 Drawing Sheets

WRIST BRACE FOR ANGLERS

TECHNICAL FIELD

This invention relates to the general field of fishing tackle. More specifically, it deals with a wrist brace for use with a fishing rod.

BACKGROUND OF THE INVENTION

The general form and structure of fishing tackle for individual use has not changed greatly for many years. The rod and reel, for example, remains one of the most popular structures in use. However, it is often difficult and tiring for the angler to properly hold and manipulate the rod and reel for long periods of time. This is particularly true when the angler holds the rod with one hand while simultaneously trying to operate the reel with the other hand. This problem is even greater for individuals with weak wrists and grips. Thus, some type of brace, bracket or other means has been sought to increase mechanical advantage and assist the angler in the use of the rod and reel. Representative examples of prior art attempts to accomplish these goals may be seen in the following patents:

U.S. Pat. No. 4,014,129 issued to Capra in 1977 for a "Fishing Rod Stabilizing Handle". Capra teaches a rod stabilizing handle and attachment for spinning-type fishing rods capable of floating a fishing rod. A stabilizing handle member configured for attachment to or at the posterior handle portion of a spinning rod includes and elongate broad upwardly directed surface for normally matingly engaging a substantial length of that forearm of the fisherman which is holding the rod.

U.S. Pat. No. 4,190,977 issued to Casper in 1980 for a "Forearm Rest for Fishing Rods". Casper teaches a forearm rest that extends outwardly from the handle for accommodating the forearm of the angler and includes a handle attaching portion for secure connection to the handle.

U.S. Pat. No. 5,159,775 issued to Sutula in 1992 for a "Support Handle for a Fishing Rod". Sutula, Jr., teaches a support handle with means for attaching the handle directly to the angler's forearm so that the rod and forearm are parallel.

U.S. Pat. No. Des. 353,262 issued to Cantavespre et al. in 1994 for a "Arm-mounting Stabilizing Brace for Fishing Rods". Cantavespre et al. shows a strap for attachment to the angler's forearm anchoring a member that hooks over the handle of a rod.

U.S. Pat. No. 5,992,079 issued to Michels et al. in 1999 for a "Wristsaver Fishing Rod Handle and System". Michels et al teaches an ergonomic handle design having a mounting section for coupling to the pole, a first handle portion disposed at an angle to the mounting portion, and a second handle portion mounted at a second predetermined angle to the handle.

U.S. Pat. No. 6,098,333 issued to Wichizer et al. in 2000 for a "Leverage Feature for a Fishing Rod Handle". Wickizer et al. teaches a leverage feature extending laterally from the fishing rod handle a short distance to the rear of the reel. It is intended to be engaged by the side of the hand when the rod handle is palm gripped during play of a hooked fish to greatly improved the leverage able to be exerted by the hand in resisting the tipping of the rod by the pull of the fish.

U.S. Pat. No. 6,295,755 issued to Macaluso in 2001 for an "Adjustable Arm Support for Fishing Rod Handle". Macaluso teaches a device supporting the arm of a fisherman comprising an arm cradle supporting the upper forearm of the fisherman, a partially cylindrical elongated handle support member defining a partially cylindrical compartment for use in attaching the device to a fishing rod handle, and an adjustable post connecting the fishing rod to the cradle.

The last patent described above, U.S. Pat. No. 6,295,755 ("Macaluso") is the most practical of the patents issued for the purpose of providing support and bracing the arm of a fisherman. However, it is unnecessarily complex, while lacking the self-adjusting, shock absorbing, resilient features desirable for a device of this type.

SUMMARY OF THE INVENTION

It is an object of my invention to provide a lower forearm supporting brace for use with a fishing rod. I have done this by providing a device that is simple and elegant in its overall concept and design, as well as being inherently self-adjusting and shock absorbing. These features are accomplished by the provision of a brace with a lower forearm rest or cradle connected by an arcuate somewhat flexible member to a fastener adapted for connection to the handle of a fishing rod. My invention can be simply and easily molded as a single part from well-known thermoplastic materials using skills and techniques well known in the arts of plastic forming. This makes it ideal for manufacture and mass production. Further, it is simpler to use, lighter, more durable, and capable of being produced and sold at a lower price than any competing product in this field. Thus, it has as further objects, goals and purposes: Ease of manufacture, low cost, and facility and ease of usage.

DESCRIPTION OF THE INVENTION

Figure 1:
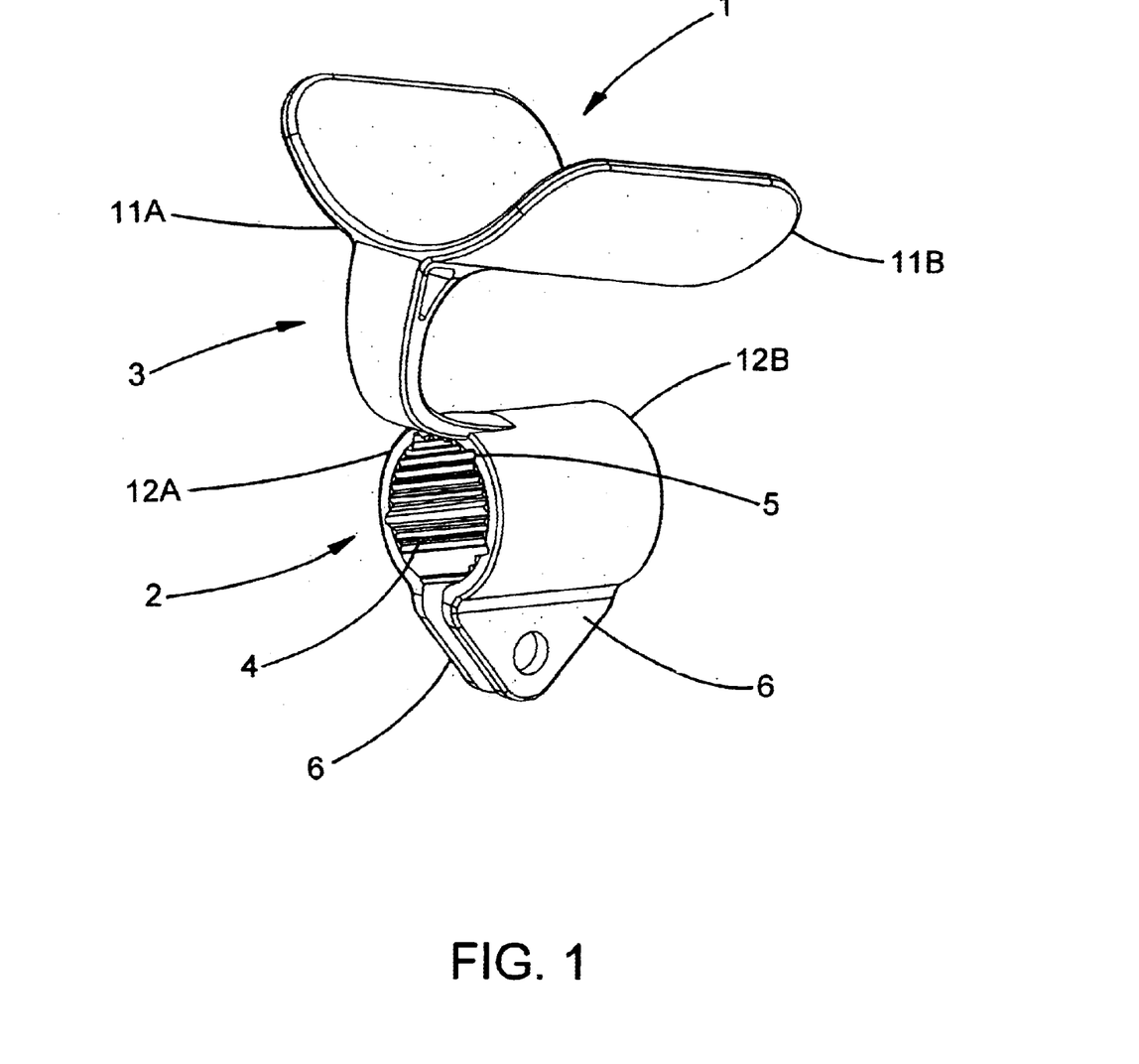
FIG. 1 provides a first perspective view of my invention.
Figure 2:
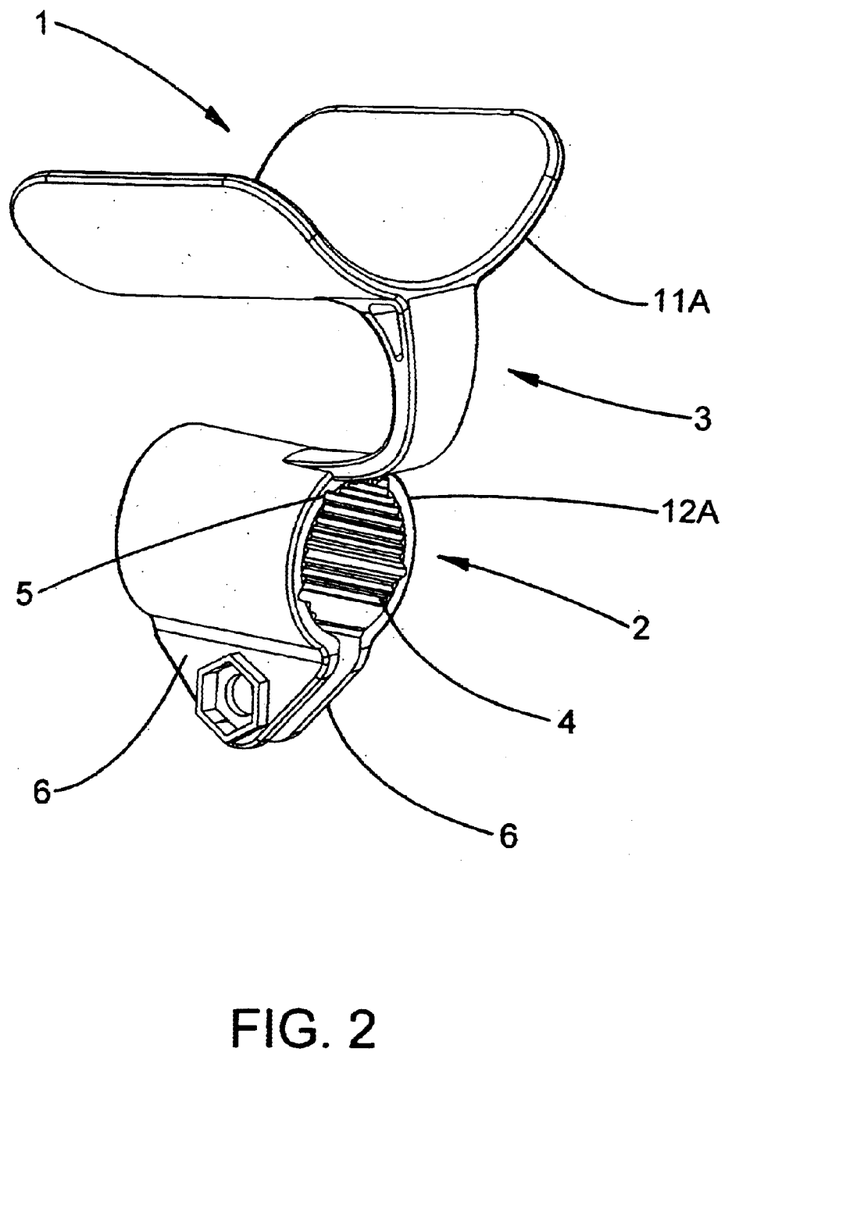
FIG. 2 provides a second perspective view of my invention.
Figure 3:
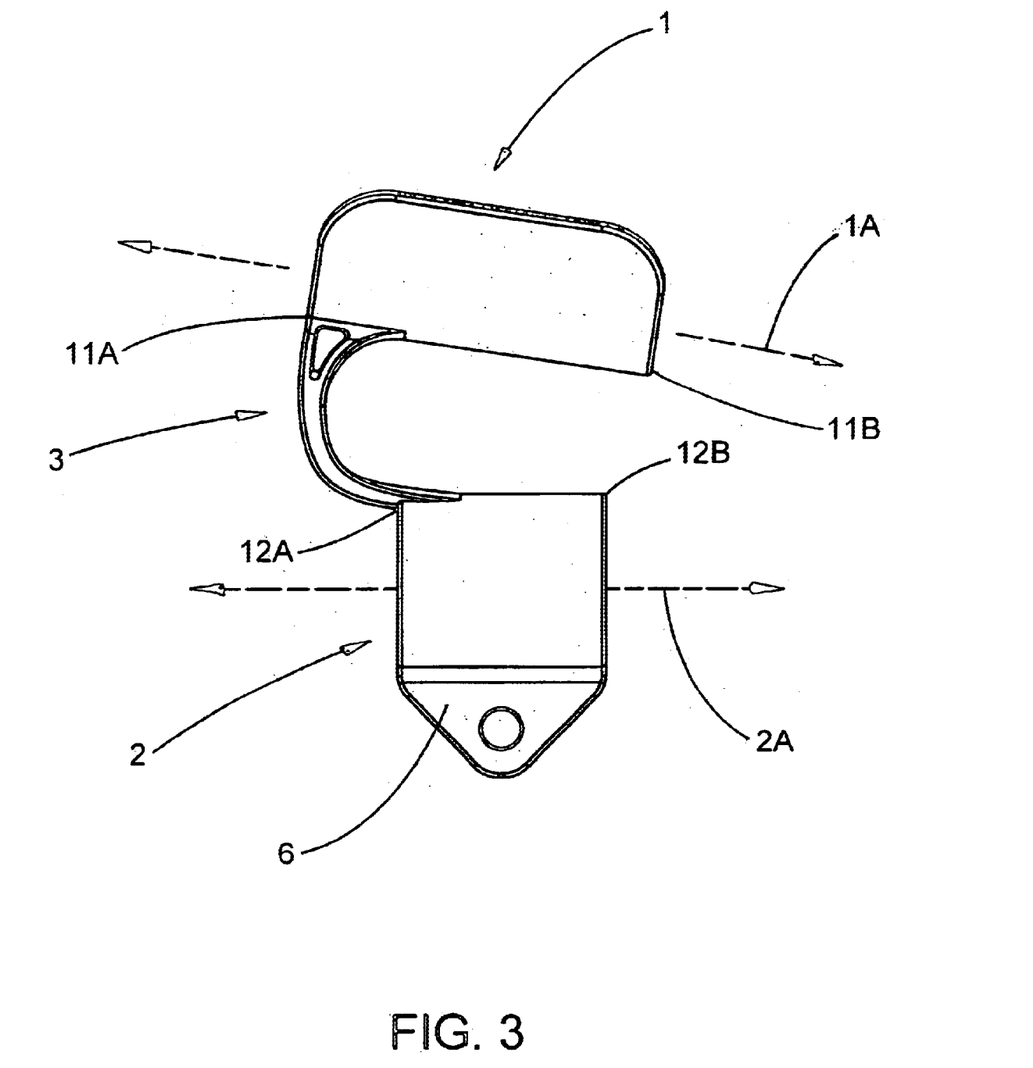
FIG. 3 provides a right side view of my invention.
Figure 4:
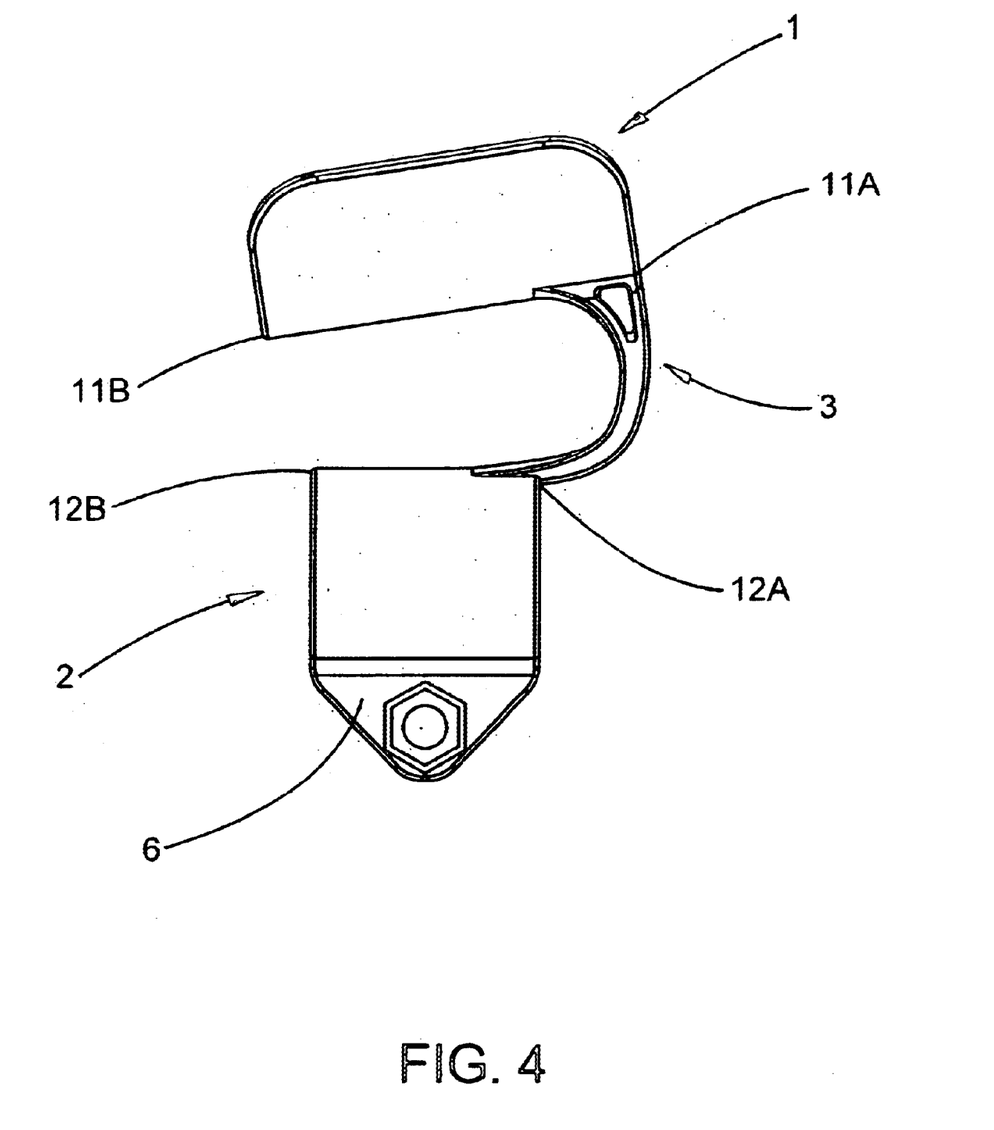
FIG. 4 provides a left side view of my invention.
Figure 5:
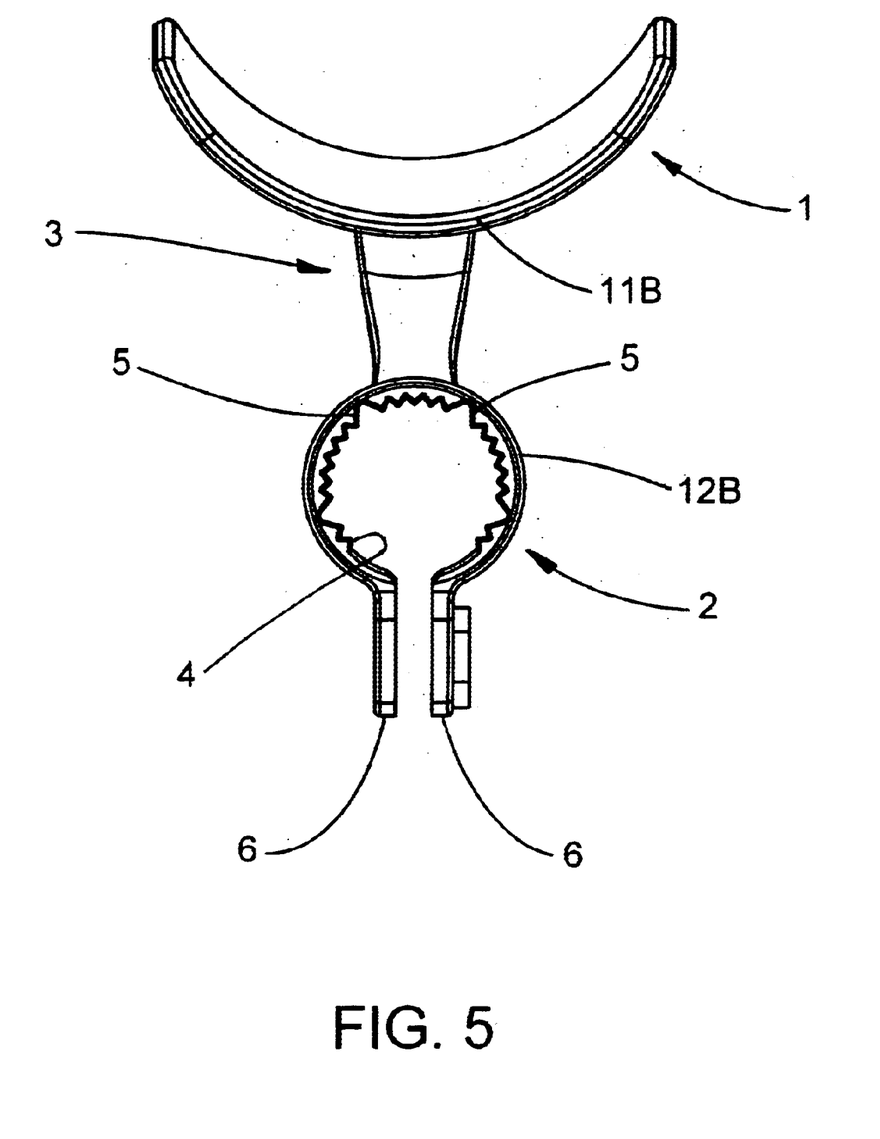
FIG. 5 provides a front side view of my invention.
Figure 6:
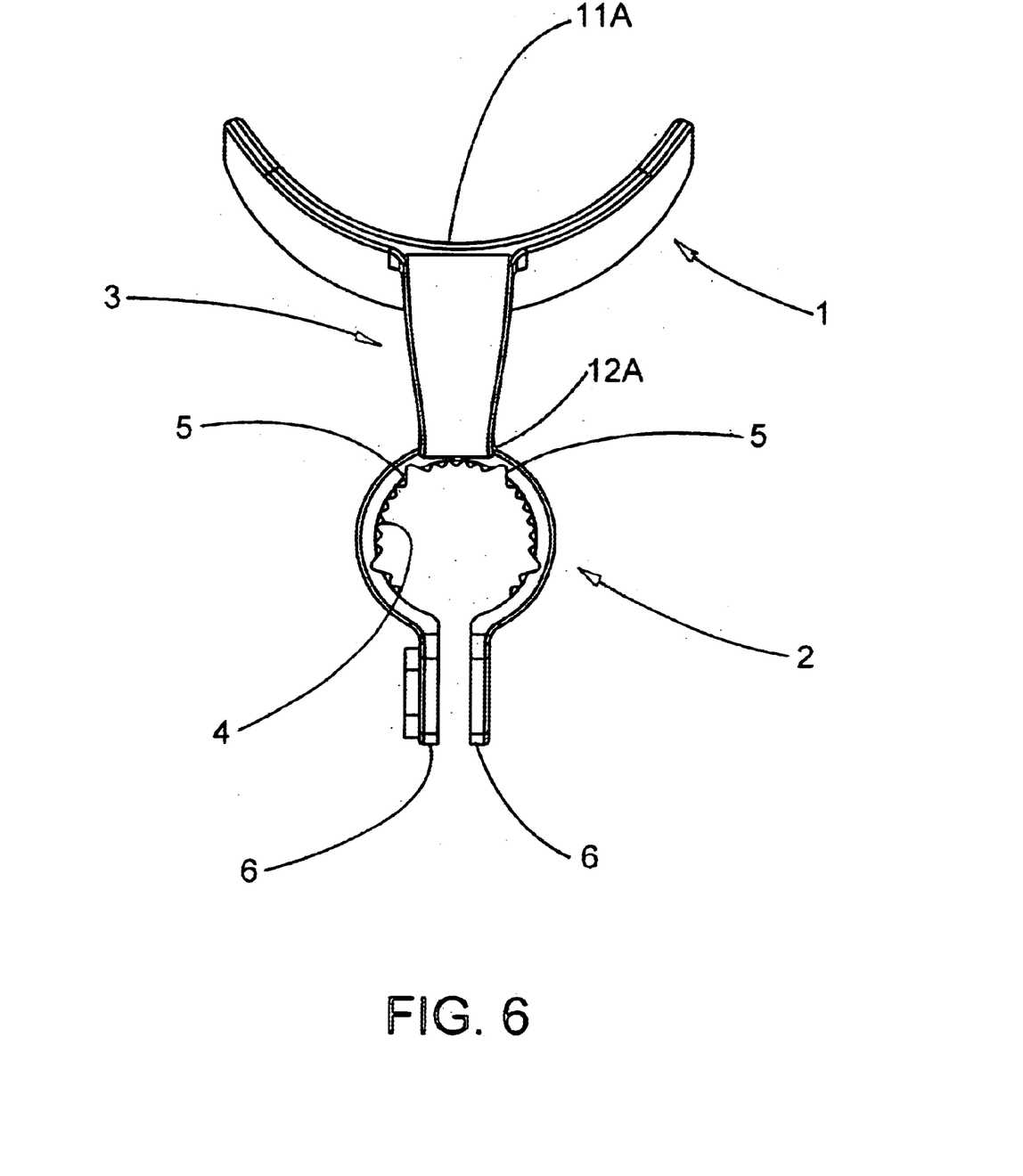
FIG. 6 provides a rear side view of my invention
Figure 7:
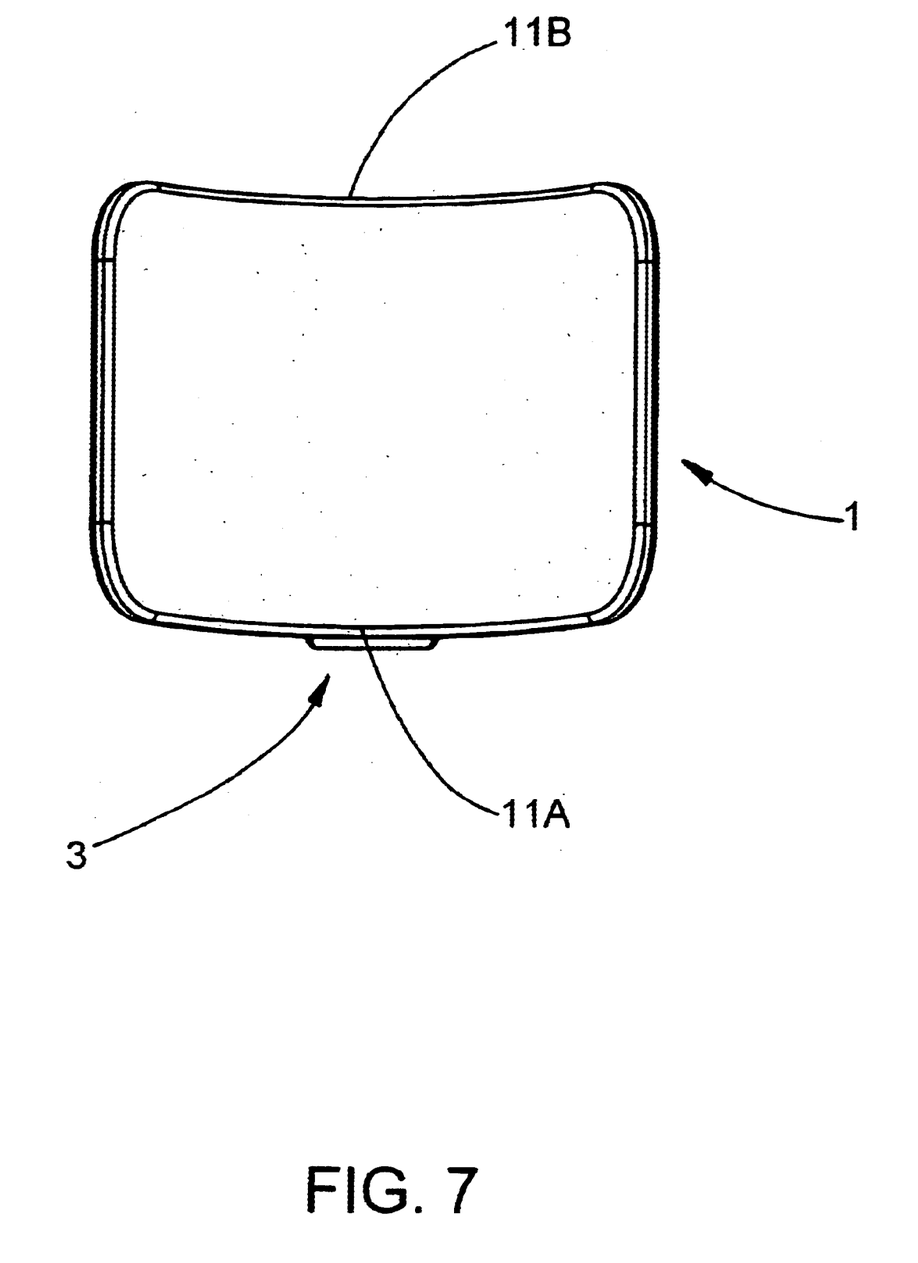
FIG. 7 provides a view of my invention from above.
Figure 8:
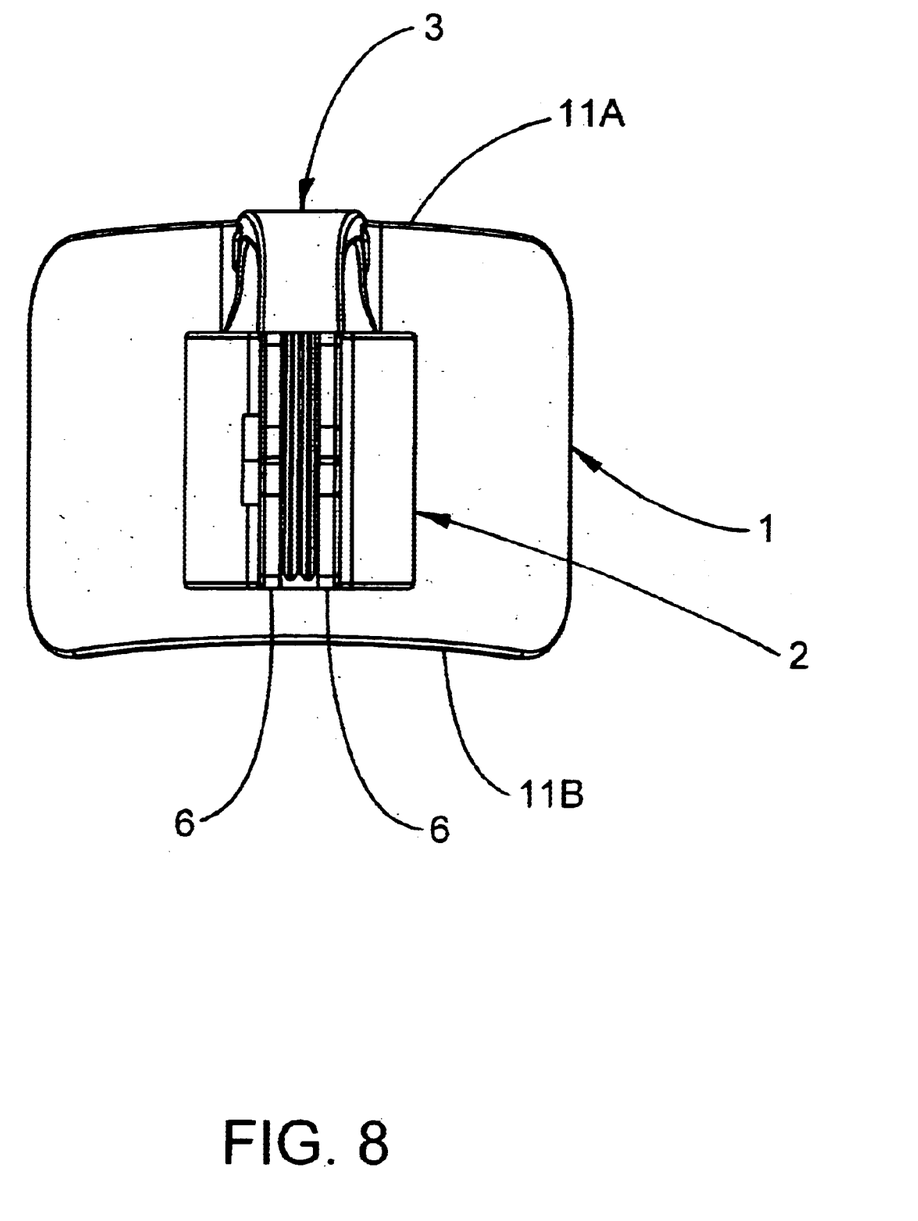
FIG. 8 provides a view of my invention from below.
Figure 9:
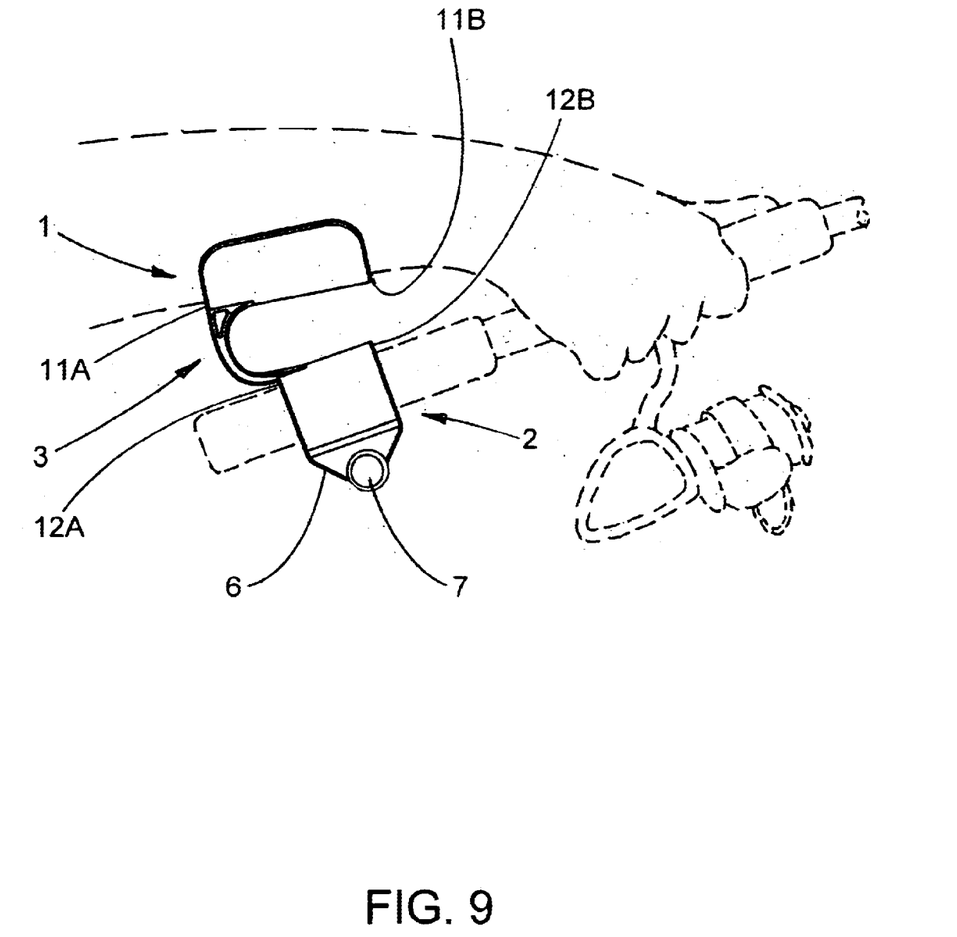
FIG. 9 provides a side view of my invention in place on a rod and reel.

My wrist brace for an angler works as a unified whole to accomplish its purposes, but can be divided into three separate parts for the sake of discussion: A wrist or lower forearm contact member (the forearm rest denoted generally by arrow 1); a fastener (denoted generally by arrow 2) for attachment of the forearm rest 1 to a fishing rod; and a resilient juncture (the flexure denoted generally by arrow 3) joining the forearm rest 1 to the fastener 2 at an advantageous angle and distance. As the drawings show, forearm rest 1 is substantially planar in shape with an arcuate cross-section (forming an ideal and comfortable cradle for the lower forearm of the user), while fastener 2 is adapted for connection to a generally cylindrical fishing rod handle.

The generally cylindrical cross-sectional shape of fastener 2 serves to define a fastener axis 2A. Forearm rest 1, as its concave surface configuration has an arcuate cross-section, also serves to define a forearm rest axis 1A. Forearm rest axis 1A and fastener axis 2A are substantially coplanar and should ideally be set at an acute angle to each other. I have found that an angle of 8.5 is optimum for this purpose. This angle provides for a comfortable relationship and angle between the forearm and the fishing rod handle for most users. However, my invention is not limited to this angle, even though it lacks cumbersome adjustability means.

In place of such cumbersome means, I have used a flexure 3 formed as an arcuate flexible member having a resilient curved portion connecting the rear edges 11A of forearm rest 1 and the rear edge 12A of fastener 2. The curve of flexure 3 bows away from the front edge 11B of forearm rest 1 and the front edge 12B of fastener 2, opening towards the front of the rod. It is formed from a resilient material (such as nylon) and, in this configuration, forms a natural bow-shaped spring between forearm rest 1 and fastener 2. The spring-like nature of flexure 3 and its positioning vis-à-vis forearm rest 1 and fastener 2 permit the angle and the distance between these elements to automatically self-adjust when my invention is used by different sized anglers. This adjustment allows my invention to easily accommodate users of different physical sizes. It also allows my invention to serve as a shock absorber, adding to the natural shock-absorbing capacity of most rods when fighting large and difficult fish, and helping to make my invention more comfortable to use.

The fastener 2 of my invention is adaptable to fit different sized cylindrical fishing rod handles. It has a generally cylindrical cross-section with teeth 4 that aid it in gripping the handle of a fishing rod. It is also provided with extra reliefs 5 that create hinge points and make it easier to slide fastener 2 over a fishing rod handle. Finally, it is provided with perforated tabs 6 to use in tightening the fastener 2 onto a rod handle via a thumb screw 7 and captive nut (or by using some other means known in the art).

Overall, my invention provides a simple, elegant and efficient solution to the problem of providing a durable and useful lower forearm support brace that relieves the stress on the wrist and reduces the wrist strength required by the fisherman. It is to be understood that the inventive concepts underlying my invention, in any of its aspects, can be incorporated in many different constructions so that the generality of the preceding description and the claims that follow is not to be superseded by the particularity of the attached drawings. Various alterations, modifications, and/or additions can be incorporated into the various constructions and arrangements of parts without departing from the spirit or ambit of the invention.

I claim:

1. A wrist brace to be connected to a rod, comprising:
    a forearm contact member having a front edge and a rear edge aligned with a front and rear of a rod, said forearm contact member having a concave surface with a longitudinal axis substantially aligned with a longitudinal rod axis, said concave surface adapted to receive a forearm of a user;
    a fastener having a front edge and a rear edge, said fastener having a generally cylindrical cross-section and being mountable to a handle of the rod; and
    a flexure including a resilient curved portion with a first end and a second end, said first end connecting to said rear edge of said forearm contact member and said second end connecting to said rear edge of said fastener, said resilient curved portion being aligned with a plane of said rod with said curved portion opening toward a front of said rod.

2. A wrist brace as set forth in claim 1 formed from molded plastic.

* * * * *